US006815036B1

(12) United States Patent
Romero

(10) Patent No.: US 6,815,036 B1
(45) Date of Patent: Nov. 9, 2004

(54) PROTECTIVE DEVICE FOR PROTECTING A SURFACE FROM SPILLAGE FROM A BUCKET

(76) Inventor: Edward J. Romero, 5203 E. Harney La., Lodi, CA (US) 95240

( * ) Notice: Subject to any disclaimer, the term of this patent is extended or adjusted under 35 U.S.C. 154(b) by 0 days.

(21) Appl. No.: 10/167,933

(22) Filed: Jun. 11, 2002

(51) Int. Cl.[7] .................................................. B32B 3/06

(52) U.S. Cl. .......................... 428/99; 248/328; 248/127; 248/149; 248/150; 248/152; 248/160; 248/161; 248/346.03; 118/504; 206/562; 206/563

(58) Field of Search ............................ 428/99; 248/328, 248/127, 149, 150, 152, 160, 161, 346.03; 118/504; 206/562, 563

(56) References Cited

U.S. PATENT DOCUMENTS

| | | | | | |
|---|---|---|---|---|---|
| 3,182,804 | A | | 5/1965 | Chades | |
| 4,071,163 | A | * | 1/1978 | Martin | 220/630 |
| 4,643,380 | A | * | 2/1987 | Copeland | 248/97 |
| 4,682,447 | A | | 7/1987 | Osborn | |
| 4,715,499 | A | | 12/1987 | Franklin | |
| 4,722,442 | A | * | 2/1988 | Smith | 206/515 |
| 4,890,807 | A | | 1/1990 | Desjardins | |
| 4,998,696 | A | * | 3/1991 | Desjardins | 248/146 |
| D386,653 | S | | 11/1997 | Brown | |
| 5,759,275 | A | | 6/1998 | Shostak | |
| 5,930,956 | A | | 8/1999 | Trosper et al. | |
| 6,070,629 | A | * | 6/2000 | Whiteside | 150/166 |

* cited by examiner

*Primary Examiner*—Nasser Ahmad
*Assistant Examiner*—Jane Rhee
(74) *Attorney, Agent, or Firm*—Thomas R. Lampe

(57) ABSTRACT

A protector device for connection to and transport with a paint bucket includes a flexible protector sheet having an interior, a stiffener member disposed in the interior to resist flexing of the protector sheet and a connector for releasably connecting the protector sheet and stiffener member to the bucket.

9 Claims, 2 Drawing Sheets

PROTECTIVE DEVICE FOR PROTECTING A SURFACE FROM SPILLAGE FROM A BUCKET

TECHNICAL FIELD

This invention relates to a protector device for connection to a bucket to protect a floor or other surface from accidental contact from spillage from the bucket. The device is portable and is transported as a unit with the bucket when the bucket is carried.

BACKGROUND OF THE INVENTION

Paint spillage is a common problem when painting and it is well known to deploy drop cloths on the floor or on other surfaces in an area where painting is being carried out. Such drop cloths are rather large and inconvenient to maintain in place and use. It is not uncommon for painters to place the bucket on surfaces not protected by a drop cloth, rather than going to the bother of placing a drop cloth in position, particularly when small or touch-up paint work is to be done. Even if drop cloths are employed, paint from the can can go through them, depending upon their porosity.

U.S. Pat. No. 5,930,956, issued Aug. 3, 1999, discloses a deployable device for protecting against soiling of non-workpiece items during painting of a workpiece which has at least one rigid section and at least one flexible section. The rigid section also acts as a central area for the flexible section. The device is folded open to protect non-workpiece items during the painting operation. There is no teaching or suggestion in the patent of a protector device for connection to a bucket which is transportable as a unit with the bucket during use. The following patents are also known: U.S. Pat. No. Des. 386,653, issued Nov. 25, 1987, U.S. Pat. No. 4,890,807, issued Jan. 2, 1990, U.S. Pat. No. 5,759,275, issued Jun. 2, 1998, U.S. Pat. No. 4,715,499, issued Dec. 29, 1987, U.S. Pat. No. 4,682,447, issued Jul. 28, 1987, and U.S. Pat. No. 3,182,804, issued May 11, 1965.

None of the patents disclose or suggest the structural elements and cooperative relationships therebetween of the protector device disclosed and claimed herein.

DISCLOSURE OF INVENTION

The present invention relates to a portable protector device or shield which is characterized by its ease of use and relative simplicity. The protector device is transportable as a unit with a paint can or bucket to which it is attached and provides a highly effective means for protecting a floor or other support surface from accidental contact with spillage from the bucket.

The protector device of the present invention includes a flexible protector sheet positionable under the bucket, the protector sheet defining a sheet interior.

A stiffener member in the form of a stiffener sheet is disposed in the protector sheet interior for resisting flexing of the protector sheet.

A connector is incorporated in the protector device for releasably connecting the protector sheet to the bucket with the stiffener member and the protector sheet both positioned under the bucket and extending radially outwardly from the bucket to surround the bottom of the bucket. The connector when releasably connecting the protector sheet to the bucket enables the protector sheet and the stiffener member to be transported as a unit with the bucket when the bucket is carried by an individual.

Other features, advantages and objects of the present invention will become apparent with reference to the following description and accompanying drawings.

BEST MODE FOR CARRYING OUT THE INVENTION

Figure 1:
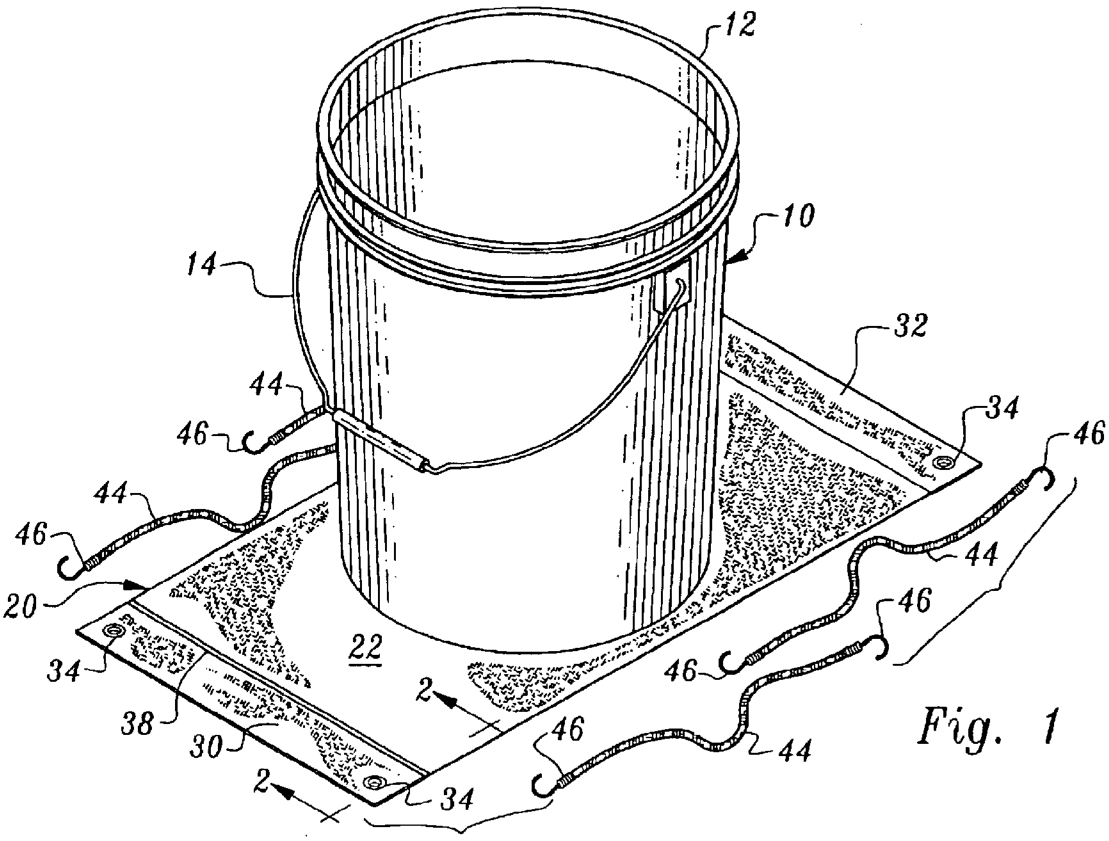
FIG. 1 is a perspective view of a paint bucket positioned on the flexible protector sheet of the protector device, bungee cords of the protector device shown prior to installation.
Figure 3:
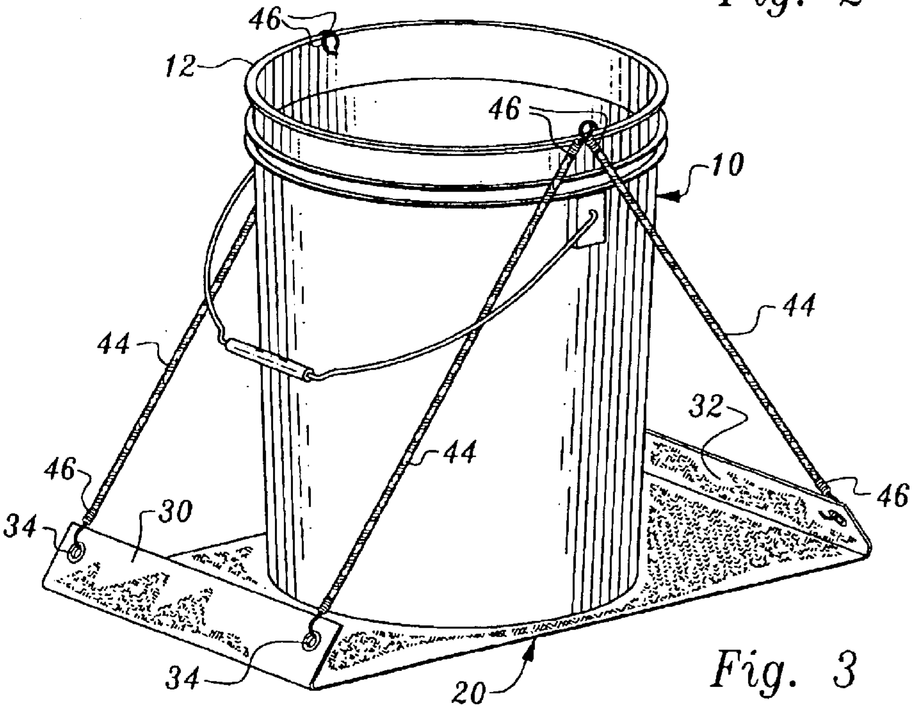
FIG. 3 is a perspective view of the protector device connected to the paint bucket.
Figure 5:
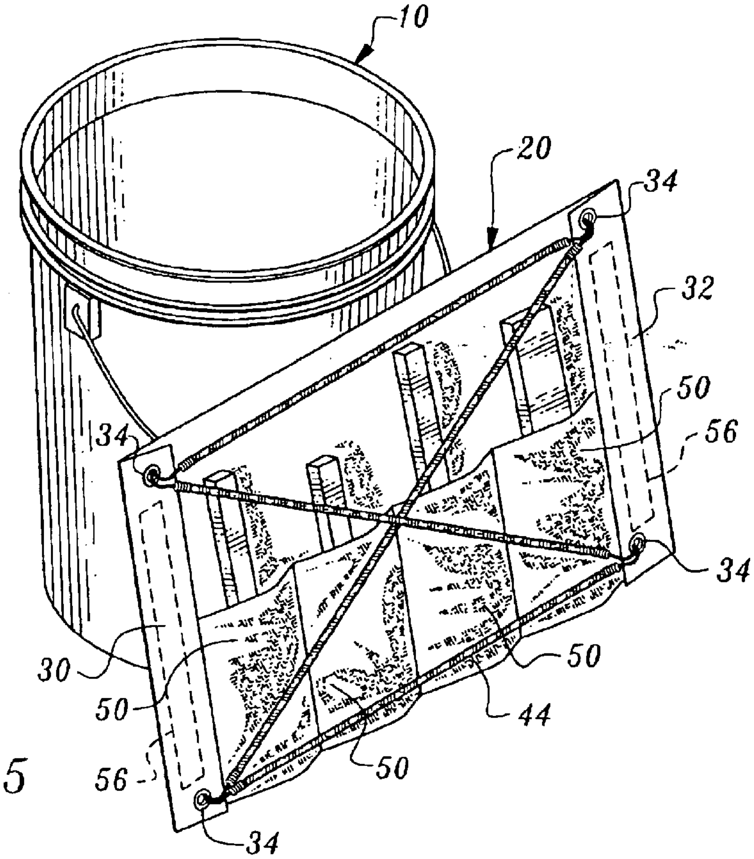
FIG. 5 shows the protector device removed from the paint bucket and configured for transport and storage as an individual unit.

A conventional paint bucket 10 is illustrated in FIGS. 1, 3 and 5, the bucket having a rim 12 at the top thereof and a pivoted handle or bail 14.

The protector device of the present invention is for connection to a bucket or pail such as paint bucket 10 to protect a floor or other surface from accidental contact with spillage from the bucket.

The protector device includes a protector sheet 20 formed of cloth such as canvas or other suitable material. The protector sheet includes an upper sheet portion 22 and a lower sheet portion 24 forming a flattened sleeve 26 defining a sheet interior 28.

Figure 2:
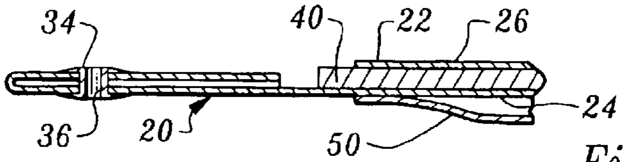
FIG. 2 is a greatly enlarged, cross-sectional view of that portion of the device delineated by line 2—2 in FIG. 1.

The protector sheet also includes two spaced end flaps 30, 32. The end flaps have grommets 34 affixed thereto adjacent to the ends of the end flaps. Each of the grommets defines a hole 36 (see FIG. 2).

Figure 4:
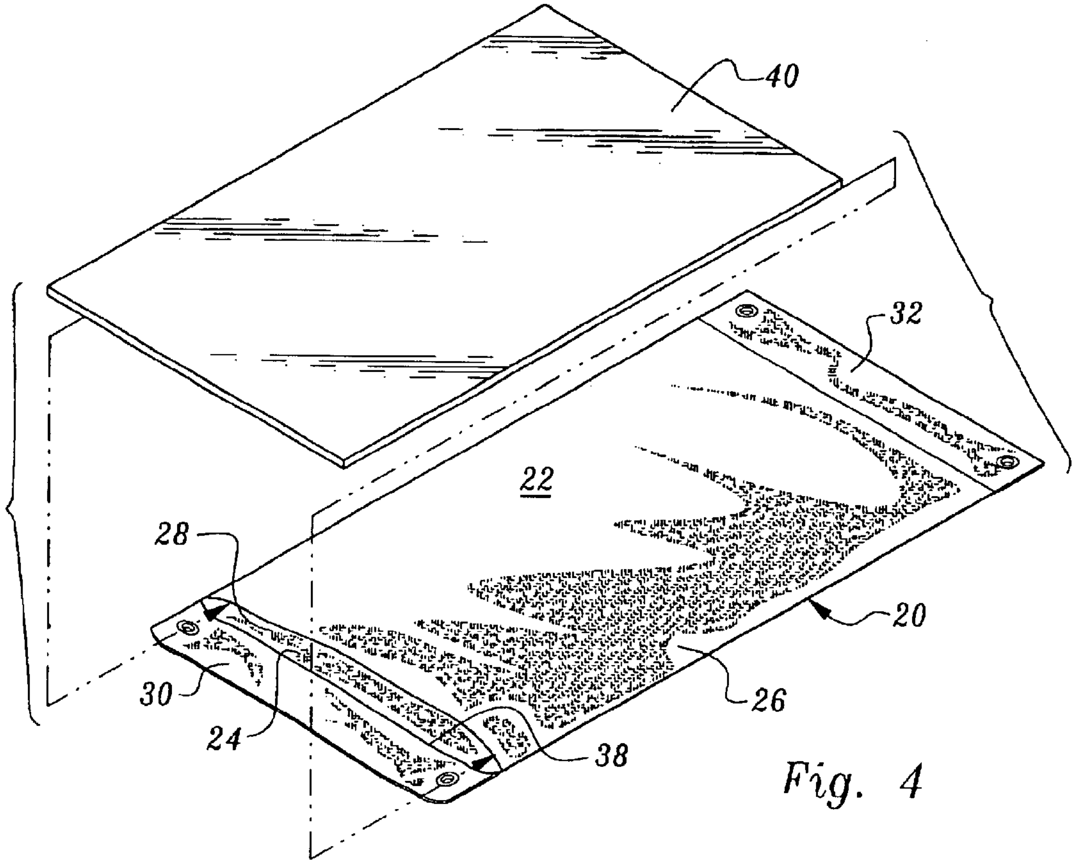
FIG. 4 is an exploded, perspective view of the protector sheet and stiffener member of the invention, illustrating diagrammatically assembly of these two components.

An elongated opening 38 is formed in upper sheet portion 22, the elongated opening extending along and adjacent to end flap 30. The elongated opening 38 communicates with sheet interior 28 and allows a stiffener sheet or board 40 of rectangular configuration to be placed in the sheet interior or removed therefrom. FIG. 4 provides an illustration of this feature. The stiffener sheet is preferably of substantially liquid impermeable material, such as fiberboard, plastic, wood, etc.

When the stiffener sheet is in position in the flattened sleeve 26 and the paint bucket is positioned on the upper sheet portion 22, as shown in FIGS. 1 and 3, the stiffener member and the protector sheet are both under the bucket and extend radially outwardly from the bucket to surround the bottom thereof.

Connector bungee cords 44 having hooks 46 at the ends thereof comprise other components of the invention. The bungees are hooked over rim 12 of the bucket, as shown in FIG. 3, and through the grommets 44 of the end flaps 30, 32 to exert tensional forces retaining the bucket 10 and upper sheet portion 22 in fixed position relative to one another. The flattened sleeve 26 of the protector sheet maintains a planar configuration since the stiffener sheet or board 40 prevents it from flexing. In the arrangement illustrated, the hooks 46 of each pair of hooks at the top of the bucket are interconnected to maintain them in proper position on the bucket rim.

When not being lifted by the individual using the bucket, the pivoted handle 14 thereof will drop into position on two of the bungee cords as shown in FIG. 3 to prevent the handle from engaging the side of the bucket and thus facilitate manual access thereto. End flap 30 angles upwardly and acts as a stop, preventing the stiffener sheet 40 from exiting elongated opening 38.

The bucket and protector device are transported as a unit to any desired position, the protector device operating at all times to protect a floor or other surface from accidental contact from spillage from the bucket. The stiffener member provides additional protection against paint passing through the protector device. To move the bucket and protector device, the user simply lifts and carries the unitary assembly by the bucket handle in the ordinary manner used to lift and carry buckets. The straight sides of the protector device allow the bucket-protector device combination to be positioned directly against a wall, if desired.

FIG. 5 shows the protector device removed from the bucket. The removed protector device is configured into a flat package which facilitates transport and storage thereof. In the unitary flat structure of the protector device when removed from the bucket as shown in FIG. 5, the end flaps are disposed essentially face-to-face with a sheet portion and are oriented toward one another. The bungee cords 44 have the hooks thereof disposed in the grommets 34 of the end flaps and extend between the end flaps to exert continuous pulling forces on the flaps to maintain them in position. In FIG. 5, a pouch 50 having pockets for accommodating objects 52 has been illustrated releasably connected to protector sheet 20 by suitable means such as strips 56 of synthetic material which adhere when pressed together.

What is claimed is:

1. In combination:

a bucket having an upper rim, a pivoted handle and a bucket bottom; and a protector device attached to the bucket to protect a surface from accidental contact from spillage from the bucket, said protector device including a flexible protector sheet positioned under the bucket, said protector sheet having a protector sheet upper surface, a stiffener sheet parallel to said protector sheet and disposed under the protector sheet upper surface, said stiffener sheet resisting flexing of said protector sheet under the bucket, and a connector releasably connecting said protector sheet and stiffener sheet to the bucket with the protector device in engagement with the bucket bottom and said stiffener sheet and said protector sheet both disposed under said bucket and extending radially outwardly from said bucket to surround and project outwardly away from the bucket bottom whereby the protector sheet and stiffener sheet can be transported as a unit with the bucket when the bucket is carried by an individual, said protector sheet including an upper sheet portion and a lower sheet portion forming a flattened sleeve defining a protector sheet interior accommodating said stiffener sheet.

2. The combination according to claim 1 wherein said connector comprises at least one resilient cord connected to said protector sheet, extending to the upper rim and releasably secured to said upper rim, said resilient cord continuously biasing said protector sheet and stiffener sheet toward said upper rim.

3. The combination according to claim 1 wherein said protector sheet includes two spaced end flaps formed by at least one of said sheet portions, said end flaps projecting away from opposite ends of said stiffener sheet, and said connector comprising at least one resilient elongated element connected to each of said end flaps and extending to said upper rim.

4. The combination according to claim 3 wherein said protector sheet defines an elongated opening adjacent to and extending along an end flap communicating with said protector sheet interior for selectively allowing placement of said stiffener sheet in said protector sheet interior or removal of said stiffener sheet from said protector sheet interior, said end flap adjacent to said elongated opening extending upwardly and inwardly under the urging of the resilient elongated element connected thereto to block egress of said stiffener sheet from said protector sheet interior through said elongated opening.

5. The combination according to claim 3 wherein each of said end flaps has spaced holes formed therein, said connector comprising a plurality of bungee cords having end hooks, some of the hooks of the bungee cords located in the spaced holes formed in said end flaps and other of the hooks in engagement with the upper rim.

6. The combination according to claim 5 wherein said protector sheet is formed of fabric and wherein said spaced holes are defined by grommets affixed to said fabric.

7. The combination according to claim 5 wherein at least some of said bungee cords are engageable by said pivoted handle to maintain the pivoted handle out of engagement with a side of the bucket to facilitate manual access to the pivoted handle.

8. The combination according to claim 1 wherein the protector device additionally comprises a pouch for holding objects releasably attached to a protector sheet portion.

9. The combination according to claim 5 wherein said protector device is convertible when separated from the bucket into a unitary flat structure wherein said end flaps are disposed face-to-face with a protector sheet portion and generally oriented toward one another, said bungee cords extending between said end flaps with the hooks of the bungee cords disposed in the holes formed in said end flaps to exert continuous pulling forces on said flaps.

* * * * *